United States Patent Office 3,321,485
Patented May 23, 1967

3,321,485
ORGANOMANGANESE INDOLE COMPOUNDS AND PROCESS FOR PREPARING SAME
John Kozikowski, Walled Lake, Mich., and Michael Cais, Haifa, Israel, assignors to Ethyl Corporation, New York, N.Y., a corporation of Virginia
No Drawing. Original application Dec. 28, 1960, Ser. No. 78,820. Divided and this application May 3, 1965, Ser. No. 463,426
2 Claims. (Cl. 260—319.1)

This application is a division of application Ser. No. 78,820, filed Dec. 28, 1960.

This invention relates to a variety of organometallic compounds and the processes employed in their production. More specifically, this invention relates to compounds and processes involving the use of an acylcyclopentadienyl manganese tricarbonyl compound.

An object of our invention is to provide new organometallic compounds and processes for their preparation. A further object is to provide acylcyclopentadienyl manganese tricarbonyl derivatives and processes for their preparation. Additional objects will become apparent from a reading of the specification and claims which follow.

When an acylcyclopentadienyl manganese tricarbonyl is reacted with a hydrazine compound having the formula:

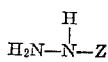

in which Z is a hydrocarbon group containing from one to about 18 carbon atoms which can be an aryl, an alkyl, or a cycloalkyl group, a hydrazone derivative of acylcyclpoentadienyl manganese tricarbonyl is obtained. A preferred form is the reaction of acetylcyclopentadienyl manganese tricarbonyl with phenyl hydrazine to form the phenyl hydrazone derivative of acetylcyclopentadienyl manganese tricarbonyl. The objects of this invention are accomplished by preparing an indole derivative of cyclopentadienyl manganese tricarbonyl from a phenyl hydrazone derivative of acylcyclopentadienyl manganese tricarbonyl. The reaction is generally carried out in the presence of a neutral solvent by heating the reaction mixture at reflux for a short period of time at a temperature of about 100° C. To further illustrate this form of our invention, there is presented the following example.

Example I

A solution comprising 5 grams of acetylcyclopentadienyl manganese tricarbonyl dissolved in 50 ml. of ethanol was heated with 2.1 grams of phenyl hydrazine on a steam bath for 10 minutes. The reaction mixture was then cooled and diluted with 3 ml. of water and filtered to yield 6.3 grams of yellow crystals which were the phenyl hydrazone derivative of acetylcyclopentadienyl manganese tricarbonyl. The crystals had a melting point of 105–107° C. On further dilution of the filtrate with water, there were obtained an additional 0.4 gram of the phenyl hydrazone derivative having a melting point of 104–106° C. The total yield of product was 98.5 percent.

The phenyl hydrazone derivative of acetylcyclopentadienyl manganese tricarbonyl can then be treated with a Lewis acid catalyst in the presence of concentrated hydrochloric acid to yield the indole derivative of cyclopentadienyl manganese tricarbonyl. A preferred Lewis acid catalyst for this reaction is zinc chloride. To further illustrate this aspect of our invention, there is presented the following example.

Example II

Acetylcyclopentadienyl manganese tricarbonyl phenyl hydrazone (4 grams) and zinc chloride (20 grams) were heated on an oil bath at 100° C. The temperature was raised to 170° C. over a 30-minute period while stirring the mixture. The mixture was kept at 170° C. for 10 minutes after which 20 grams of sand were added and mixed into the original mixture. After cooling, the mixture was diluted with water (100 ml.) and concentrated hydrochloric acid (3 ml.) and heated on the steam bath for 1½ hours.

The cooled mixture was filtered and the residue was boiled with ethanol (100 ml.) and Norit-A. The mixture was filtered through Celite; the Celite was washed with hot ethanol and the filtrate and washings were combined and evaporated on a steam bath. The residue was triturated several times with a boiling mixture of benzene-petroleum ether (1:1 volume ratio), and the organic solvents were collected, filtered, and concentrated to a small volume. On cooling, there were obtained two grams of yellow crystals having a melting point of 132–134° C. The filtrate afforded another 0.9 gram of crystals on cooling. An analytical sample was crystallized from benzene-petroleum ether and had a melting point of 135–136° C.

Calculated for $C_{16}H_{10}NMnO_3$: C, 60.1; H, 3.13; N, 4.30; Mn, 17.2. Found: C, 60.5; H, 3.40; N, 3.95; Mn, 17.3.

The preparation of other acylcyclopentadienyl manganese tricarbonyl compounds is described in our copending patent application Ser. No. 78,820, filed Dec. 28, 1960.

Among the important uses of our compounds is their use as fuel and oil additives. For example, they are useful antiknocks when added to gasoline. They may be used as primary antiknocks in which they are the major antiknock component in the fuel or as supplemental antiknocks. When used as supplemental antiknocks, they are present as the minor antiknock component in the fuel in addition to a primary antiknock such as a tetraalkyllead compound. Typical alkyllead compounds are tetraethyllead tetrabutyllead, tetramethyllead and various mixed lead alkyls such as dimethyldiethyllead, diethyldibutyllead and the like. When used as either a supplemental or primary antiknock, our compounds may be present in the gasoline in combinaton with typical scavengers such as ethylene dichloride, ethylene dibromide, tricresylphosphate, trimethylphosphate and the like.

The compounds of our invention have further utility as additives to residual and distillate fuels generally, e.g., jet fuels, home heater fuels and diesel fuels, to reduce smoke and/or soot formation. Also, they may be employed as additives to lubricating oils in which case they act to improve the lubricity of the base oil. In addition, they may be employed as additives to solid fuels to control burning rate.

Our compounds are further useful in many metal plating applications. In order to effect metal plating using the compounds, they are decomposed in an evacuated space containing the object to be plated. On decomposition, they lay down a film of metal on the object. The gaseous plating may be carried out in the presence of an inert gas so as to prevent oxidation of the plating metal or the object to be plated during the plating operations.

The gaseous plating technique described above finds wide application in forming coatings which are not only decorative but also protect the underlying substrate material.

Deposition of metal on a glass cloth illustrates the applied process. A glass cloth band weighing one gram is dried for one hour in an oven at 150° C. It is then placed in a tube which is devoid of air and there is added to the tube 0.5 gram of bromoacetylcyclopentadienyl manganese tricarbonyl. The tube is heated at 400° C. for one hour after which time it is cooled and opened. The cloth has a uniform metallic gray appearance and exhibits a gain in weight of about 0.02 gram.

A further utility for our compounds is as drying agents in which case the compounds are incorporated in paints, varnish, printing inks, synthetic resins of the drying oil type, oil enamels and the like. A still further utility for our compounds is their use as chemical intermediates in preparation of metal-containing polymeric materials or in the preparation of new organic materials.

Having fully defined the novel compounds of our invention, their mode of preparation and their many utilities, we desire to be limited only within the lawful scope of the appended claims.

We claim:
1. [(2 - indolyl)cyclopentadienyl]manganese tricarbonyl.

2. Process comprising reacting the phenyl hydrazone derivative of acetylcyclopentadienyl manganese tricarbonyl with zinc chloride catalyst in the presence of concentrated hydrochloric acid to yield [(2-indolyl)cyclopentadienyl]manganese tricarbonyl.

References Cited by the Examiner

Elderfield, Heterocyclic Compounds, vol. 3, Wiley, 1952, pp. 8–11 relied upon.

Fieser et al., Advanced Organic Chemistry, Reinhold, 1961, p. 492 relied on.

ALEX MAZEL, *Primary Examiner.*

HENRY R. JILES, *Examiner.*

DONALD G. DAUS, *Assistant Examiner.*